US 9,739,908 B2

(12) United States Patent
Hosking et al.

(10) Patent No.: US 9,739,908 B2
(45) Date of Patent: Aug. 22, 2017

(54) UTILITY USAGE FORECASTING

(71) Applicant: International Business Machines Corporation, Armonk, NY (US)

(72) Inventors: Jonathan R. M. Hosking, Scarsdale, NY (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 14/149,205

(22) Filed: Jan. 7, 2014

(65) Prior Publication Data
US 2015/0192697 A1    Jul. 9, 2015

(51) Int. Cl.
G01W 1/00    (2006.01)
G01W 1/10    (2006.01)

(52) U.S. Cl.
CPC .................................... *G01W 1/10* (2013.01)

(58) Field of Classification Search
None
See application file for complete search history.

(56) References Cited

U.S. PATENT DOCUMENTS

| 7,647,137 | B2 | 1/2010 | Schindler |
| 8,019,697 | B2* | 9/2011 | Ozog ............... G06Q 10/06315 705/400 |
| 8,219,505 | B2 | 7/2012 | Richard et al. |
| 8,364,609 | B2 | 1/2013 | Ozog |
| 8,406,935 | B2 | 3/2013 | Ko et al. |
| 2010/0198423 | A1 | 8/2010 | Hirst |
| 2010/0217550 | A1 | 8/2010 | Crabtree et al. |
| 2011/0282505 | A1 | 11/2011 | Tomita et al. |
| 2012/0072040 | A1 | 3/2012 | Kaji |
| 2016/0033949 | A1* | 2/2016 | Noda ................. G06Q 10/0631 700/291 |

OTHER PUBLICATIONS

Harvey, A., and Koopman, S.J. "Forecasting Hourly Electricity Demand Using Time-Varying Splines". Journal of the American Statistical Association. vol. 88. No. 424. (Dec. 1993). pp. 1228-1236. American Statistical Association. <http://www.jstor.org/stagble/2291261>. Accessed: Apr. 3, 2011.

Hor, C-L, et al. "Analyzing the Impact of Weather Variables on Monthly Electricity Demand". IEEE Transactions on Power Systems. vol. 20. No. 4. Nov. 2005. pp. 2078-2085.

(Continued)

*Primary Examiner* — David M Gray
*Assistant Examiner* — Geoffrey T Evans
(74) *Attorney, Agent, or Firm* — Jinesh P. Patel; William H. Hartwell

(57) ABSTRACT

The computer creates a utility demand forecast model for weather parameters by receiving a plurality of utility parameter values, wherein each received utility parameter value corresponds to a weather parameter value. Determining that a range of weather parameter values lacks a sufficient amount of corresponding received utility parameter values. Determining one or more utility parameter values that corresponds to the range of weather parameter values. Creating a model which correlates the received and the determined utility parameter values with the corresponding weather parameters values.

20 Claims, 5 Drawing Sheets

(56) References Cited

OTHER PUBLICATIONS

Hosking, J.R.M., and Natarajan, R. "Modeling of Temperature and Weather Effects for Short-term Electricity Demand Forecasting". IBM T.J. Watson Research Center. Received Jul. 9, 2013.
Taylor, J. W., and Majithia, S. "Using Combined Forecasts with Changing Weights for Electricity Demand Profiling". The Journal of the Operational Research Society. vol. 51. No. 1. Part Special Issue: OR and Strategy (Jan. 2000). pp. 72-82. Palgrave Macmillan Journals. <http://www.jstor.org/stable/253949>. Accessed: Nov. 6, 2013 20:28.
Zarnikau, J. "Functional forms in energy demand modeling". Science Direct® Energy Economics 25. (2003). pp. 603-613. USA.

* cited by examiner

| TEMP °F | USAGE (MW) |
|---|---|
| 10 | 6.00 |
| 11 | 5.90 |
| 12 | 5.25 |
| 13 | 5.00 |
| 14 | 4.35 |
| 15 | 3.00 |
| 16 | 2.85 | ental method for forecasting.

UTILITY USAGE FORECASTING

STATEMENT REGARDING FEDERALLY SPONSORED RESEARCH OF DEVELOPMENT

This invention was made with Government support under DE-OE0000190 awarded by Department of Energy. The Government has certain rights in this invention.

FIELD OF THE INVENTION

The present invention relates generally to the field of utility usage forecasting and more particularly to determining data for improved forecasting.

BACKGROUND OF THE INVENTION

Weather effects are often a contributing factor to the variability in utility usage forecasting. Weather effects can include past outdoor temperatures, past wind chill factors, past heat indices, and past precipitation measurement. Utilities can include natural gas providers, oil providers, electricity providers, and water supply providers. The modeling of weather effects, such as outdoor temperature, for a utility usage, such as electricity, allows for the electrical company to prepare for the commercial and residential demand in the short-term future. Utilizing previously recorded electrical usage for a given temperature allows for a compilation of data to be used to create a model representing a predicted electrical usage at a given temperature.

Modeling of weather effects involves specifying a mathematical formula for the relationship between usage and weather measurements. For example, the effect of the temperature on the utility usage is often described using a single index called "Degree Days" which can be further split into two categories, Heating Degree Days (HDD) and Cooling Degree Days (CDD). At a given instant in time, at most one of these indices will be relevant, and the other will have a zero value. For example, HDD is a measure of the severity of the cold weather as measured by the extent and duration of the temperature deviation below a baseline temperature (e.g., 15° C.) that is used to quantify the heating load. Similarly CDD is a measure of the severity of the hot weather as measured by the extent and duration of the temperature deviation above a baseline temperature (e.g., 20° C.) that is used to quantify the cooling load. Typically the utility usage is assumed to be correlated to the HDD or CDD. However, such a model for the relationship between the temperature and the utility usage is not ideal for calibrating accurate forecasting models, which are better modeled using nonlinear relationships.

In short-term forecasting, certain issues may arise with the ability to calibrate the forecasting models when information such as utility usage values is incomplete or missing for a range of weather effect values. For example, historical data for electrical usage may be unavailable for certain outlier values for the temperatures, such as for example, unseasonably hot or cold temperatures that may have never been encountered in the historical data. In another example, the amount of historical data for electrical usage might not include complete information if the historical data was taken from only a certain time period of the entire year. The appropriate electrical usage data might not exist for a temperature range that is typically not seen in the historical data during the certain season for which the calibrated model forecasts are required.

SUMMARY

Embodiments of the present invention disclose a method for creating a utility demand forecast model for weather parameters. A computer receiving, by one or more processors, a plurality of utility parameter values, wherein each received utility parameter value, corresponds to a weather parameter value. The computer determining, by one or more processors, that a range of weather parameter values lacks a sufficient amount of corresponding received utility parameter values. The computer determining, by one or more processors, one or more utility parameter values that corresponds to the range of weather parameter values. The computer creating, by one or more processors, a model which correlates the received and the determined utility parameter values with corresponding weather parameters values.

Embodiments of the present invention disclose a computer program product for creating a utility demand forecast model for weather parameters. A program product comprising, program instructions stored on the one or more computer readable storage media. The computer program product receiving, by one or more processors, a plurality of utility parameter values, wherein each received utility parameter value corresponds to a weather parameter value. The computer program product determining, by one or more processors, that a range of weather parameter values lacks a sufficient amount of corresponding received utility parameter values. The computer program product determining, by one or more processors, one or more utility parameter values that corresponds to the range of weather parameter values. The computer program product creating, by one or more processors, a model which correlates the received and the determined utility parameter values with corresponding weather parameters values.

Embodiments of the present invention disclose a computer system for creating a utility demand forecast model for weather parameters. A computer system comprising program instructions stored on the one or more computer readable storage media, for execution by at least one of the one or more computer processors. The computer system receiving, by one or more processors, a plurality of utility parameter values, wherein each received utility parameter value corresponds to a weather parameter value. The computer system determining, by one or more processors, that a range of weather parameter values lacks a sufficient amount of corresponding received utility parameter values. The computer system determining, by one or more processors, one or more utility parameter values that corresponds to the range of weather parameter values. The computer system creating, by one or more processors, a model which correlates the received and the determined utility parameter values with corresponding weather parameters values.

DETAILED DESCRIPTION

Figure 1:
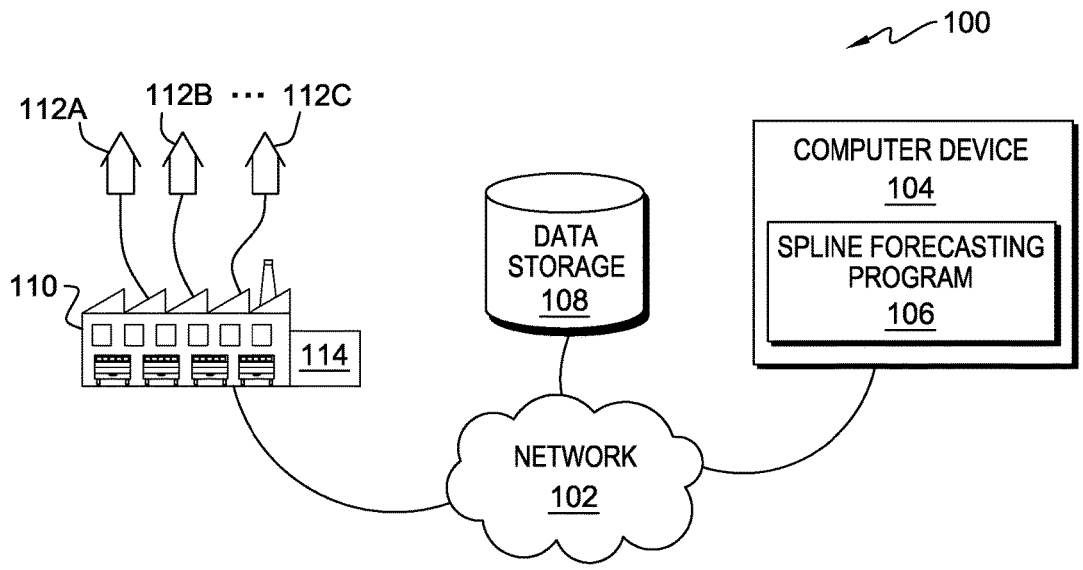
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Cubic splines are a commonly used form for representing this nonlinear relationship. A cubic spline is a smooth function that takes the form of a cubic polynomial in a set of neighboring and non-overlapping intervals. It is defined by a set of parameters equal in number to the number of said non-overlapping intervals. However, these parameters which define the cubic spline typically have no direct physical or intuitive meaning.

A forecasting program can utilize a modeling method that uses cubic splines to represent the nonlinear usage-weather relationship. When calibrating to historical data, the resulting estimated cubic spline parameters in the representation can be interpretable by using concepts, such as Heating Degree Days (HDD) and Cooling Degree Days (CDD) parameterizations within a nonlinear cubic spline representation.

The model utilizing this representation expresses the relationship between the utility usage and a single predictor variable, such as the temperature, in the mathematical form of a cubic spline with "natural" boundary conditions. This form is defined by a set of "knots", a set of values $x_1, \ldots, x_K$, given in increasing order, and specified in advance of the analysis to take values within the expected range of the data for the predictor variable (e.g., 0° C. to 24° C.). Between each pair of adjacent knots the spline approximation is a cubic polynomial; outside the boundary knots, i.e., for values of the predictor variable less than $x_1$ and greater than $x_K$, the spline approximation is a linear function; at each knot the function value and the first two derivatives are continuous. These conditions define the spline approximation except for a set of K parameters that can be specified by the user based on any available prior information, or estimated by calibrating the approximation on a set of historical data, or some combination of these approaches, such as a Bayesian analysis that makes use both of prior information and historical data about the parameter values.

There are numerous ways of formulating the K parameters for specifying the spline approximation. For example, one can specify the function value at each knot, or the function value at each boundary knot and the first derivative of the function at each of the other "interior" knots. These parameters typically do not have a direct physical interpretation. In the present invention, the representation of the spline approximation involves a set of parameters of which at least two have a clear physical interpretation. These parameters are the slopes of the spline approximation in the two end segments of the approximation, i.e., values of the predictor variable less than $x_1$ and greater than $x_K$. In a model of usage versus a weather-related predictor variable such as temperature, these slopes represent the change in usage for each one-degree increase in temperature at extremely low or extremely high temperatures.

FIG. 1 is a functional block diagram illustrating a distributed data processing environment, generally designated 100, in accordance with one embodiment of the present invention. Distributed data processing environment 100 includes computer device 104, data storage 108, and utility station 110 all interconnected over network 102.

Computer device 104 can be a laptop computer, a tablet computer, a netbook computer, a personal computer (PCs), a desktop computer, a personal digital assistant (PDA), a smartphone, or any other programmable electronic device capable of communicating with utility station 110 via network 102. Computer device 104 includes spline forecasting program 106, which has access to data storage 108 and information contained within. Data storage 108 can be a collection of storage units accessible by either computer device 104 or utility station 110.

Utility station 110 is connected to a plurality of structures 112A, 112B, and additional structures not illustrated, designated as structure 112C. Utility station 110 can be a natural gas provider, an oil provider, an electricity provider, a water supply provider, or any other utility provider where usage of the other utility can be monitored. In this embodiment, utility station 110 provides electricity to structures 112A, 112B, and 112C and metering device 114 monitors the amount of electricity, utility station 110 provides to structures 112A, 112B, and 112C. In other embodiments, metering device 114 can be located at structures 112A, 112B, and 112C and metering device 114 can send recorded monitored values to utility station 110. Metering device 114 can also monitor and record weather effect values at the location of utility station 110. Weather effects can be outdoor temperature values, heat index values, wind chill factor values, precipitation values, or any other weather effect values where there can be a correlation between the other weather effect value and utility usage value. The recorded weather effect values and utility usage values from metering device 114 are stored in data storage 108. Data storage 108 can also store multiple correlations between the weather effect values and both, the utility usage values and a particular time period such as, a time of day, month, and season.

Spline forecasting program 106 can create a utility forecast model with the use of limited historical data, through a series of operational steps. Spline forecasting program 106 can access the weather effect values and the utility usage values in data storage 108 to generate the utility forecasting model. Spline forecasting program 106 has the ability to create a forecasting model for situations where either of the utility usage values or weather effect values may be limited, inconsistent, and/or missing.

In one embodiment, computer device 102 may be owned, and at least nominally controlled (e.g., required to install various security software, updates, etc.), by the same entity controlling utility station 110. In such an embodiment, computer device 104 may be considered part of utility station 110.

Network 102 can be any combination of connections and protocols that will support communications between computer device 104, data storage 108, and utility station 110. Network 102 can include, for example, a local area network (LAN), a wide area network (WAN) such as the internet, a cellular network, or any combination of the preceding, and can further include wired, wireless, and/or fiber optic connections.

Figure 2:
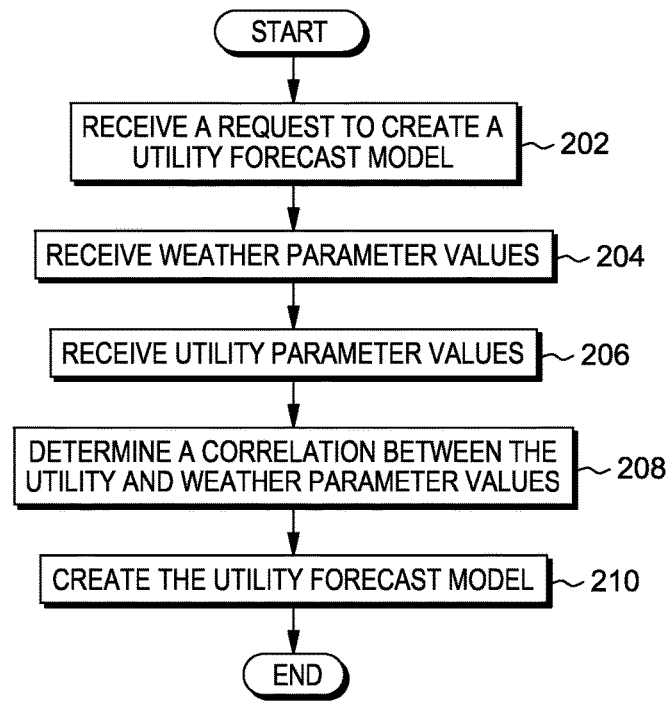
FIG. 2 is a flowchart depicting operational steps of a spline forecasting program, in accordance with an embodiment of the present invention.

FIG. 2 is a flowchart depicting operational steps of a spline forecasting program 106, in accordance with an embodiment of the present invention.

In an exemplary embodiment, spline forecasting program 106 produces a forecasting model for short-term electricity usage. The weather effect on which spline forecasting program 106 bases the short-term electricity usage forecast model is outdoor temperature at utility station 110 as previously recorded by monitoring device 114.

Spline forecasting program 106 receives a request to create a utility usage forecast model (step 202). In one embodiment, spline forecasting program 106 receives an input from a user specifying a type of utility parameter and a type of weather parameter for which the utility forecast usage model is to be based upon. In this example, the utility parameter is previous electricity usage for a specified period and the weather parameter is previous out door temperatures for the specified period. In the exemplary embodiment, the specified period is equivalent to 6 months incorporating the spring and summer months. Spline forecasting program 106 is creating a utility usage forecast model for the subsequent 6 months incorporating the fall and winter months.

Spline forecasting program 106 receives weather parameter values (step 204). In one embodiment, spline forecasting program 106 queries data storage 108 to obtain the weather parameter values. Continuing from the previously mentioned example, outdoor temperature values are received for the specified period of 6 months. However, temperature values for the subsequent 6 months (i.e., fall and winter months) may not be within the bound of the specified 6 months from which spline forecasting program 106 bases the utility usage forecast model upon.

To incorporate such temperatures outside the bound of the specified 6 month period, spline forecasting program 106 can receive an input from a user specifying a desired range for the forecasting model. In one example, if during the specified 6 month period the temperature range was between 45° F. and 90° F. and the temperature for the subsequent 6 months is in the 0° F. to 45° F., spline forecasting program 106 may not include certain temperature values due to the limitation of the temperature parameter values being utilized for the creation of the utility usage forecasting model. To incorporate the 0° F. to 45° F. temperature parameter range, spline forecasting program 106 can receive an input from a user with the specified range or the user can pre-program spline forecasting program 106 to utilize the same range for temperature parameter value for creating the forecasting model.

Spline forecasting program 106 receives utility parameter values (step 206). In one embodiment, spline forecasting program 106 can query data storage 108 to obtain the utility parameter values corresponding to the weather parameter values in step 204. Continuing from the previously mentioned example, the utility parameter values are the electricity usage values for a given day during the specified 6 month period. Such electrical usage values for any give day during the specified 6 month period can be stored in data storage 108 where each of the stored electrical usage values has an associate temperature parameter value. Spline forecasting program 106 can receive the electrical usage value for any time in a 24-hour period for each given day of the specified 6 month period.

In one example, a user can pre-program spline forecasting program 106 to utilize electrical usage values during the coldest part of a given day (i.e., low temperature) to forecast electrical usage during the night time. In another example, the user can pre-program spline forecasting program 106 to utilize electrical usage values during the hottest part of a give day (i.e., high temperatures) to forecast electrical usage during the middle of the day.

Spline forecasting program 106 determines a correlation between the weather parameter values and the utility parameter values (step 208). The correlation, in mathematical terms, is also known as the line of best fit. The correlation is an estimation performed to create a single utility parameter value for every weather parameter value. Continuing from the previously mentioned example, spline forecasting program 106 can determine a correlation between outdoor temperature values and electricity usage values. Since the temperature range is 0° F. and 90° F. for the specified and subsequent 6 months, spline forecasting program 106 determines the correlation for the temperature range of 0° F. and 90° F. Spline forecasting program 106 determines a single correlation based on the electricity usage values for the corresponding temperature values for the specified 6 months, upon which spline forecasting program 106 can utilize the determined correlation to create a utility usage forecast mode for the temperature range of 0° F. and 90° F.

Spline forecasting program 106 represents the relationship between utility usage and any single predictor variable in the mathematical form of a cubic spline with so-called "natural" boundary conditions. This form is defined by a set of "knots", a set of at least four values $x_1, \ldots, x_K$, (i.e., with K≥4), given in increasing order, and specified in advance of the analysis. Between each pair of adjacent knots the spline approximation is a cubic polynomial. Outside the boundary knots, i.e., for values of the predictor variable less than $x_1$ and greater than $x_K$, the spline approximation is a linear function and at each knot the function value and its first two derivatives are continuous. Spline forecasting program 106 can utilize another set of K parameters to specify the spline approximation. In this embodiment, these parameters include the level and slope of the spline approximation at each boundary knot. If K is greater than 4, any set of additional parameters that suffices to define the spline approximation may be used. In an exemplary embodiment the spline parameters are the level and slope of the spline approximation at each boundary knot, and the second derivative of the spline approximation at the interior knots $x_3 \leq x \leq x_{K-2}$. Spline forecasting program 106 can express the spline approximation as a weighted sum of basis functions by constructing the given knot locations $x_1, \ldots, x_K$.

A real-valued function of a real variable x is a cubic spline function with knots $t_1, t_2, t_3, t_4$ if the function is a cubic polynomial on each of the intervals $-\infty < x < t_1$, $t_1 \leq x < t_2$, $t_2 \leq x < t_3$, $t_3 \leq x < t_4$, and $t_4 \leq x < \infty$, and the values of the function and the first two derivatives are continuous at the values $t_1, t_2, t_3, t_4$.

Spline forecasting program 106 defines four basis functions designed to have specific values outside the range of the knots.

Let $L_1(x)$ be a spline function with knots $x_1, \ldots, x_4$, with the properties that $L_1(x)=1$ if $x<x_1$ and $L_1(x)=0$ if $x>x_4$.

Let $S_1(x)$ be a spline function with knots $x_1, \ldots, x_4$, with the properties that $S_1(x)=x-x_1$ if $x<x_1$ and $S_1(x)=0$ if $x>x_4$.

Let $L_K(x)$ be a spline function with knots $x_{K-3}, \ldots, x_K$, with the properties that $L_K(x)=0$ if $x<x_{K-3}$ and $L_K(x)=1$ if $x>x_K$.

Let $S_K(x)$ be a spline function with knots $x_{K-3}, \ldots, x_K$, with the properties that $S_K(x)=0$ if $x<x_{K-3}$ and $S_K(x)=x-x_K$ if $x>x_K$.

In each of the cases, the function values in the interval $x_1 < x < x_4$ (for $L_1$ and $S_1$) or $x_{K-3} \leq x < x_K$ (for $L_K$ and $S_K$) can be specified by 12 constants, the four coefficients of the cubic polynomial in each of the three intervals $x_1 \leq x < x_2$, $x_2 \leq x < x_3$, $x_3 \leq x < x_4$ (for $L_1$ and $S_1$) or $x_{K-3} \leq x < x_{K-2}$, $x_{K-2} \leq x < x_{K-1}$, $x_{K-1} \leq x < x_K$ (for $L_K$ and $S_K$). The properties of a cubic spline function, i.e., continuity of the function and its first two derivatives at the four knot values, provide 12 linear constraints on the coefficients that suffice to determine the coefficients exactly. Spline forecasting program 106 can compute the coefficients in practice by solving a set of 12 simultaneous linear equations derived from the said conditions on the coefficients.

If K>4, define a further K-4 basis functions $B_k(X)$, $k=1, \ldots, K-4$, recursively by setting $$B_k^{(0)}(x) = \begin{cases} 1, & x_k \leq x < x_{k+1}, \\ 0, & \text{otherwise} \end{cases},$$

for $k=1, \ldots, K-1$, and for $m=1, 2, 3$ define $$B_k^{(m)}(x) = \frac{x - x_k}{x_{k+m} - x_k} B_k^{(m-1)}(x) + \frac{x_{k+m+1} - x}{x_{k+m+1} - x_{k+1}} B_{k+1}^{(m-1)}(x)$$

for $k=1, \ldots, K-1-m$. Spline forecasting program 106 sets $B_k(x) = B_k^{(3)}(x)$, $k=1, \ldots, K-4$ and notes that $B_k(x)=0$ for $x \leq x_k$ and $x \geq x_{k+m+1}$.

Any weighted average of these basis functions is a natural cubic spline, i.e., a function that is linear in the two end segments $-\infty < x < x_1$ and $x_k \leq x < \infty$ respectively, quadratic in the adjacent intervals $x_1 < x < x_2$ and $x_{K-1} < x < x_K$, and cubic in the inner intervals $x_k < x < x_{k+1}$, $k=2, \ldots, K-2$.

At $x=x_1$, function $L_1$ has unit intercept and zero slope, function $S_1$ has zero intercept and unit slope, and the other basis functions all have zero intercept and zero slope. Thus in a function approximation that is a weighted average of the basis functions, the weight assigned to $L_1$ will be the function value of the approximation at $x=x_1$ and the weight assigned to $S_1$ will be the slope of the approximation at $x=x_1$ and throughout the interval $-\infty<x<x_1$.

Similarly, at $x=x_K$, function $L_K$ has unit intercept and zero slope, function $S_K$ has zero intercept and unit slope, and the other basis functions all have zero intercept and zero slope. Thus in a function approximation that is a weighted average of the basis functions, the weight assigned to $L_K$ will be the function value of the approximation at $x=x_K$ and the weight assigned to $S_K$ will be the slope of the approximation at $x=x_K$ and throughout the interval $x_K<x<\infty$.

Spline forecasting program 106 creates the utility usage forecast model (step 210). Utilizing the determined correlation from step 208, spline forecasting program 106 can create a single utility usage forecast value for every temperature parameter value in the temperature range. An interval for the temperature parameter values can be pre-programmed by a user into spline forecasting program 106 to limit the number of utility forecast values spline forecasting program 106 produces.

Figure 3:
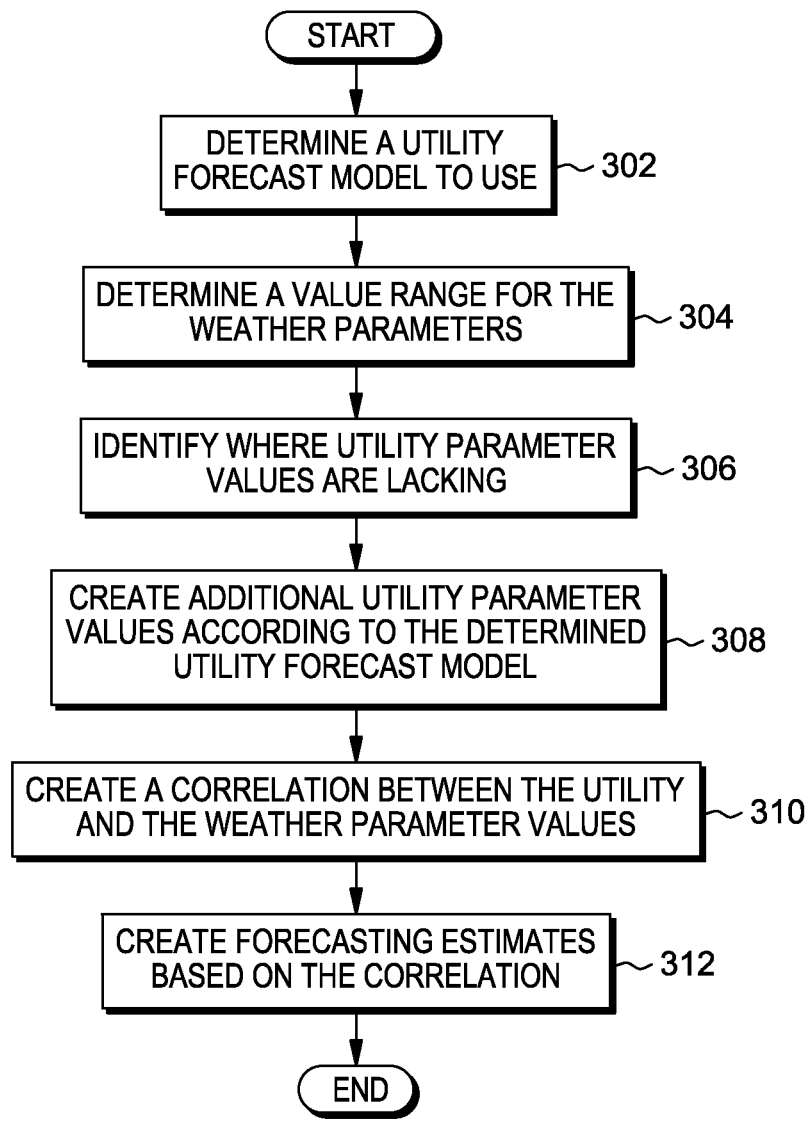
FIG. 3 is a flowchart depicting operational steps of the spline forecasting program creating a utility forecast model, in accordance with an embodiment of the present invention.

FIG. 3 is a flowchart depicting operational steps of the spline forecasting program creating a utility forecast model, in accordance with an embodiment of the present invention.

As previously discussed in step 210, spline forecasting program 106 is capable of creating a utility forecast model based on the correlation between utility parameter values and temperature parameter values. However, in situations such as the previously mentioned example, the amount of utility parameter values may be limited or non existent for temperature parameter values where spline forecasting program 106 is creating the utility usage forecast model. Spline forecasting program 106 can identify and compensate for situations where a limited amount of utility parameter values are not present.

Spline forecasting program 106 determines a utility forecast model to use (step 302). A user can pre-program spline forecasting program 106 to utilize the same forecasting model whenever spline forecasting program 106 receives a request to create a utility forecast model in step 202. In one embodiment, spline forecasting program 106 can determine to use a utility forecast model which can utilize received utility parameter values for corresponding weather parameter values to generate additional utility parameter values where spline forecasting program 106 deems the amount of utility parameter values as lacking. Spline forecasting program 106 can create the additional utility parameter values based on estimation and a probability of the additional utility parameter values occurring for the corresponding temperature parameter values. In another embodiment, spline forecasting program 106 can determine to use a utility forecast model which can utilize two or more correlations to create a utility forecast model.

Spline forecasting program 106 determines a value range for the weather parameter values (step 304). The value range for the weather parameter values represents the value range for which spline forecasting program 106 creates a forecast model. In one embodiment, spline forecasting program 106 determines the value range for the weather parameter values by evaluating the received weather parameter values in step 204. Spline forecasting program 106 can determine the upper and lower bounds of the value range by determining the highest and the lowest values in the received weather parameter values. The upper and lower bounds can represent the range for which spline forecasting program 106 creates the utility forecast model.

In another embodiment, spline forecasting program 106 can query the user for the value range for the weather parameter values. In addition to determining the upper and lower bounds for the value range, spline forecasting program 106 can query the user to determine if the upper and lower bounds for the value range are correct. In the event the upper and lower bounds do not represent the desired value range for the utility forecast model, spline forecasting program 106 can query the user for the correct upper and lower bounds that represent the desired value range. Spline forecasting program 106 can store the received value range and base the utility forecast model on the received value range. It is to be noted, spline forecasting program 106 can forego the determining of the upper and lower bounds for the value range and query the user for the upper and lower bounds for the value range without spline forecasting program 106 providing a possible value range.

Spline forecasting program 106 identifies where utility parameter values are lacking (step 306). Spline forecasting program 106 can identify value ranges for weather parameter values where there may be limited or non existent amounts of utility parameter values. In one embodiment, spline forecasting program 106 can have a threshold where the threshold is an amount of utility parameter values in an identified value range for weather parameter values.

For example, if the weather parameter value are outdoor temperatures with a determined value range of 0° F. and 90° F. then the identified value range can be increments of 10° F., such as 20° F.-30° F. The threshold for the amount of utility parameter values, such as electricity usage values, can be 20 electricity usage values for the identified value range, such as 20° F.-30° F. If the threshold is exceeded, spline forecasting program 106 determines the amount of electricity usage values for the identified value range for temperature parameter values is not lacking and proceeds to determine if the threshold is exceeded for the next identified value range. If the threshold limit is not exceeded, spline forecasting program 106 determines that the amount of electricity usage values for the identified value range for temperature parameter values is lacking.

Spline forecasting program 106 creates additional utility parameter values according to the determined utility forecast model (step 308). The identified value ranges for weather parameter values where spline forecasting program 106 identified utility parameter values are lacking, is where spline forecasting program 106 creates additional utility parameter values. In one embodiment, spline forecasting program 106 can create the additional utility parameter values through mathematical algorithms and probability of occurrence, such as Bayesian Inference. Spline forecasting program 106 can utilize such mathematical algorithms and probability of occurrence by creating the additional utility parameter values based on the existing utility parameter values.

Spline forecasting program 106 creates a correlation between the utility parameter values and the weather parameter values (step 310). As previously discussed, the correlation is estimation, performed to create a single utility parameter value for every weather parameter value. In one embodiment, spline forecasting program 106 can constrain the approximation of the correlation by separating the weather parameter values to create two dependent correlations. For example, if the correlation between utility parameter values and weather parameter values is parabolic, spline forecasting program 106 can establish a separation at a vertex of the parabolic correlation. The separation at the vertex dictates where spline forecasting program 106 creates two separate dependent correlations. In one example, spline forecasting program 106 can establish the slope for the second correlation as ⅔ the slope for the first correlation and provide a more desirable correlation at the lower and upper bounds of the temperature parameter values for the utility parameter values.

In another embodiment, utilizing the received utility parameter values along with the additionally created utility parameter values creates a correlation with the weather parameter values. The additional utility parameters values compensate for possible correlation manipulation, for example data skewing. In an instance where there are a limited amount of utility parameter values in a range of weather parameter values, for example areas containing outliers, the correlation between the utility parameter values and weather parameter values may be skewed. Spline forecasting program 106 creates a consistent correlation with the utilization of the additionally created utility parameter values which otherwise would have created an inconsistent correlation.

Spline forecasting program 106 creates forecasting estimates based on the correlation (step 312). Utilizing the correlation, spline forecasting program 106 creates a list of forecasted estimates for utility usage for every weather parameter value. Since, the correlation is spline based; the amount of forecasted estimates for utility usage is infinite. To handle the amount of forecasted estimates, spline forecasting program 106 can select finite values when create forecasting estimates. For example, if a correlation exists between electricity usage values and temperature parameter values in the 20° F.-30° F. range, spline forecasting program 106 can create a forecasting estimate for utility usage for 1° F. intervals. Such intervals can be pre-programmed by a user into spline forecasting program 106 or spline forecasting program 106 can query the user to determine the intervals for the weather parameter values.

Figures 4A, 4B:
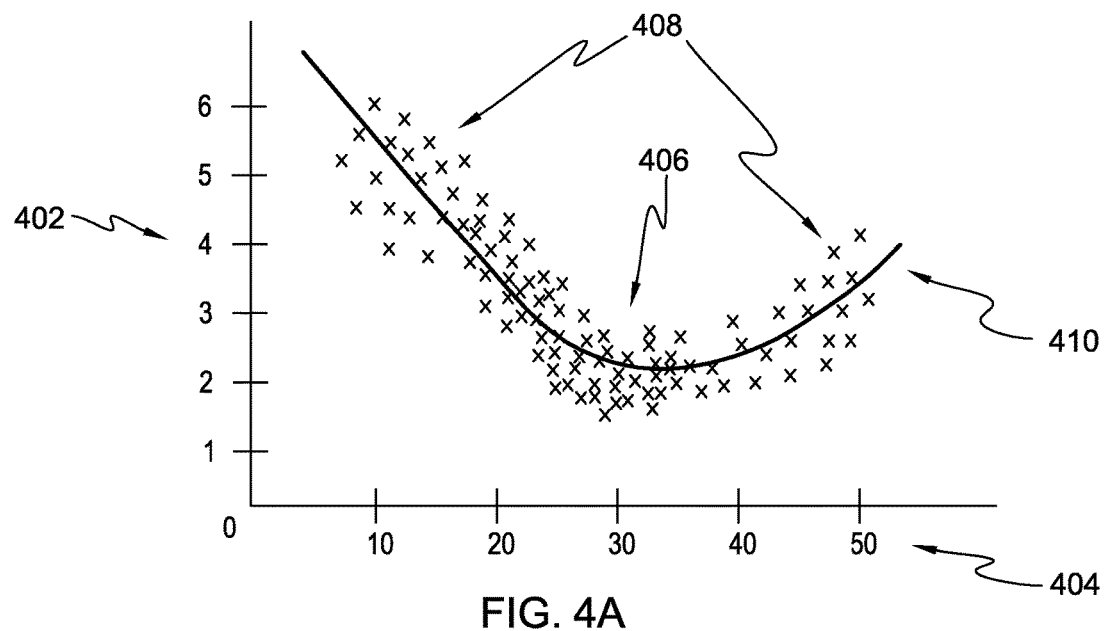
FIG. 4a is an example utility forecasting model incorporating received and created utility parameter values, in accordance with an embodiment of the present invention.
FIG. 4b is the example utility forecasting model of FIG. 4a in a different representation, in accordance with an embodiment of the present invention.

FIG. 4a is an example utility forecasting model incorporating received and created utility parameter values, in accordance with an embodiment of the present invention.

Megawatts 402 represent a unit of measurement for electrical usage and temperature 404 represent a weather parameter at which the electrical usage was recorded. In this example, the value range for temperature 404 is 10° F.-50° F. However, the utility parameter values (i.e., electrical usage values 406) which spline forecasting program 106 receives in step 206, are concentrated in the 15° F.-35° F. temperature range. In the temperature value ranges, 0° F.-14° F. and 36° F.-50° F., there is a lower concentration of electrical usage values where spline forecasting program 106 identifies as lacking in utility parameters values. Additional electrical usage values 408 compensate for the lower concentration of electrical usage values in the temperature ranges, 0° F.-14° F. and 36° F.-50° F. Correlation line 410 represents the estimation, performed to create a single utility value for a single temperature value.

FIG. 4b is the example utility forecasting model of FIG. 4a in a different representation, in accordance with an embodiment of the present invention.

Utilizing correlation line 410, spline forecasting program 106 creates a forecast estimates chart 412 for electrical usage at a given temperature in the temperature 404 value range of 10° F.-50° F. In this embodiment, the interval at which spline forecasting program 106 creates estimates is 1° F. In another embodiment, the interval at which spline forecasting program 106 creates estimates is 0.5° F. As previously discussed, the intervals can be pre-programmed by the user of spline forecasting program 106. Spline forecasting program 106 translates correlation line 410 into manageable data which can be readily accessed by a user of spline forecasting program 106.

Figure 5:
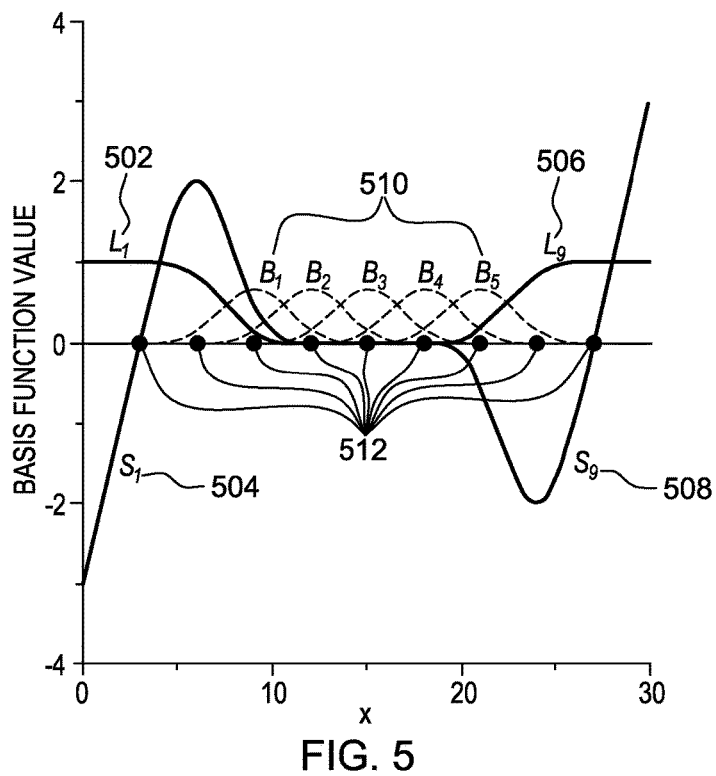
FIG. 5 is an example of the basis function set used for the spline representation, in accordance with an embodiment of the present invention.

FIG. 5 is an example of the basis function set used for the spline representation, in accordance with an embodiment of the presentation.

An example set of basis functions is illustrated in FIG. 5, for a case with knot cluster 512 containing knot values 3, 6, 9, 12, 15, 18, 21, 24, and 27. For discussion purposes, basis functions 502, 504, 506, and 508 respectively represent basis functions $L_1$, $S_1$, $L_9$, and $S_9$. Basis functions cluster 510 represent basis functions $B_1, \ldots, B_5$. Basis functions 502, 504, 506, and 508 are shown as solid lines and Basis functions cluster 510 are shown as dotted lines. Cluster points 512 on the horizontal axis indicate the knot values $x_1, \ldots, x_9$.

Spline forecasting program 106 obtains the numerical values for the parameters of the spline approximation by calibration of the relationship between usage and the predictor variable on historical data or by specification of fixed values for the parameters based on expert knowledge, or a combination of these two approaches. In an exemplary embodiment, the spline approximation between electricity usage and temperature, spline forecasting program 106 calibrates on historical data using a Bayesian approach that can incorporate prior information about the slope of the usage-temperature relationship in the end segments.

Figure 6:
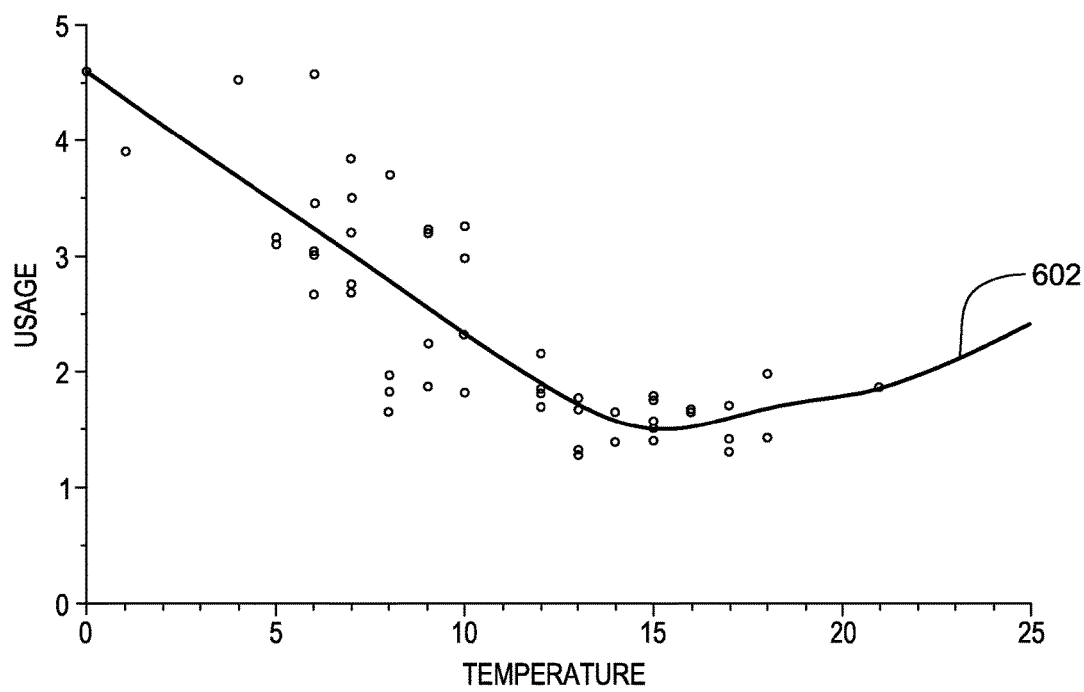
FIG. 6 is an example of a usage-temperature relation calibrated on historical data, in accordance with an embodiment of the present invention.

FIG. 6 is an example of a usage-temperature relation calibrated on historical data, in accordance with an embodiment of the present invention.

FIG. 6 illustrates the effect of the Bayesian analysis. The plotted points are a set of values of usage (kW per customer) and temperature (° C.), on Monday's at 11 AM for 52 consecutive weeks for a set of electric utility customers. The usage-temperature relation is approximated by a natural cubic spline with knots at temperature values 9, 12, 15, 18, 21, and 24, represented by knot cluster 512 in FIG. 5. This spline is fitted as a weighted average of six basis functions computed as described above, with the weights first estimated by the method of least squares. This fit is obtained by linear regression, with predictor variables given by the basis functions evaluated at the observed temperature values. The regression model has six coefficients, one for each basis function; these coefficients determine the weights assigned to each basis function in the weighted average that defines the cubic spline approximation to the usage-temperature relation. For this data set there is only one temperature value greater than 20, and the estimated weights for the basis functions describing the usage-temperature relation at high temperatures are not reliable. Spline forecasting program 106 applies a Bayesian approach, a regression model with normal prior distributions specified for each of the six regression coefficients. The regression coefficients corresponding to slopes of the usage-temperature relation were set to physically plausible values; a mean of −0.3 and standard deviation 0.5 for the slope for temperatures less than 9, and a mean of 0.15 and standard deviation 0.5 for the slope for temperatures greater than 24. Spline forecasting program 106 assigns other coefficients that diffuse prior distributions with mean 0 and standard deviation 1000. The posterior mean of the estimated usage-temperature relation is shown as solid line 602. The slope of the relation for temperatures above 24 is now 0.155, little changed from its prior mean because there is little information in the data to override the prior estimate.

Figure 7:
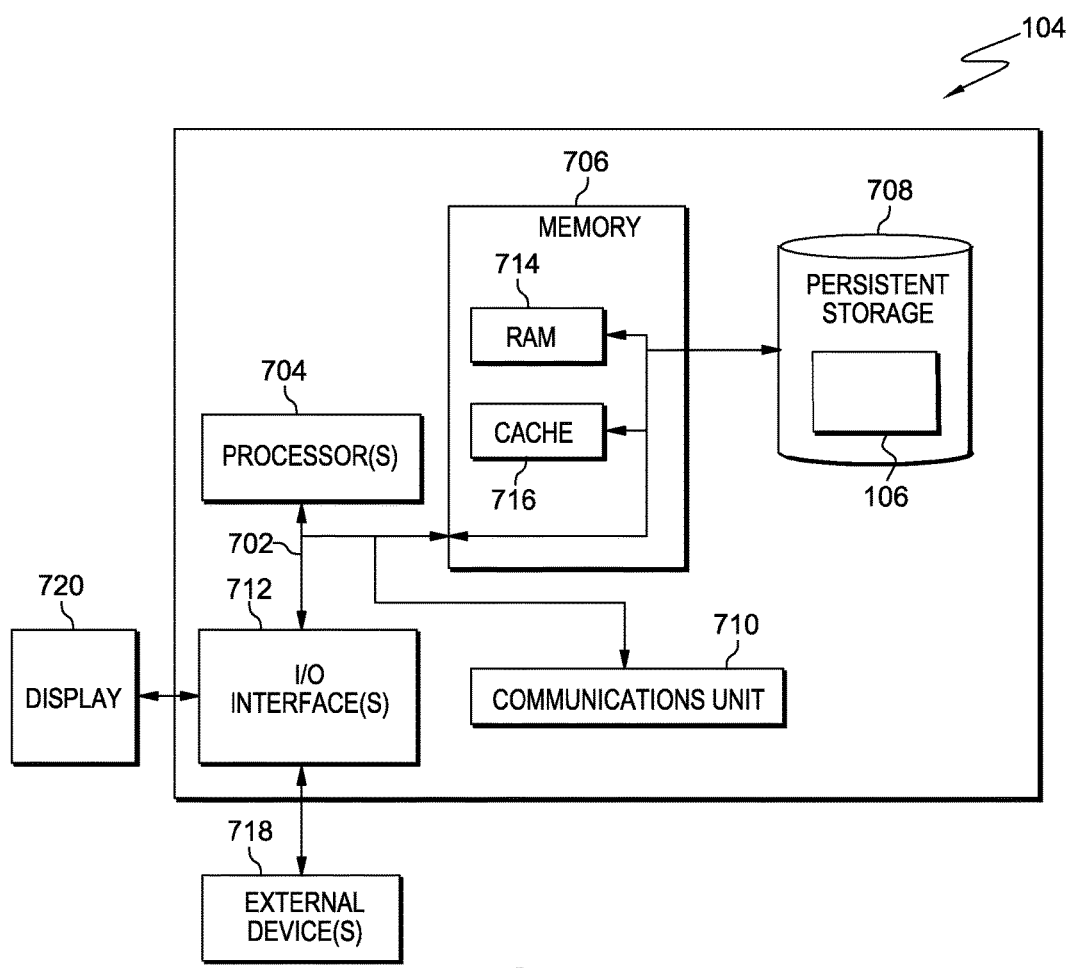
FIG. 7 depicts a block diagram of components of the computer device executing the service migration program, in accordance with an embodiment of the present invention.

FIG. 7 depicts a block diagram of components of a computer, capable of operating spline forecasting program 106 within computer device 104, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer device 104 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Spline forecasting program 106 is stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

In these examples, communications unit 710 includes one or more network interface cards. Communications unit 710 may provide communications through the use of either or both physical and wireless communications links. Spline forecasting program 106 may be downloaded to persistent storage 708 through communications unit 710.

I/O interface(s) 712 allows for input and output of data with other devices that may be connected to computer device 104. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., spline forecasting program 106, can be stored respectively on such portable computer-readable storage media and can be loaded onto persistent storage 708 via I/O interface(s) 712. I/O interface(s) 712 may also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a utility demand forecast model for weather parameters, the method comprising:
    receiving, by one or more processors, a plurality of utility parameter values, wherein each utility parameter value out of the plurality of utility parameter values corresponds to a weather parameter value;
    determining, by one or more processors, that a range of weather parameter values lacks a sufficient amount of corresponding utility parameter values out of the plurality of utility parameters;
    determining, by one or more processors, a set of utility parameter values that corresponds to the range of weather parameter values based on a portion of the plurality of utility parameter values corresponding to the range of weather parameter values lacking a sufficient amount of corresponding utility parameter values;
    creating, by one or more processors, a model which correlates the plurality of utility parameter values and the set of utility parameter values with corresponding weather parameters values; and
    providing, by one or more processors, an amount of a utility to one or more structures based on the model.

2. The method of claim 1, wherein the step of, determining that a range of weather parameter values lacks a sufficient amount of corresponding utility parameter values, comprises:
    determining, by one or more processors, that an amount of received utility parameter values that correspond to the range of the weather parameter values neither meet nor exceed a threshold.

3. The method of claim 2, wherein the step of, determining a set of utility parameter values that corresponds to the range of weather parameter values, comprises:
    determining, by one or more processors, a plurality of utility parameter values that may correspond to a first weather parameter value of the range of weather parameter values, wherein each of the plurality of utility parameter values has an associated probability of occurrence; and
    determining, by one or more processors, one or more utility parameter values from the plurality of utility parameter values, wherein the determined one or more utility parameter values has the highest associated probability of occurrence.

4. The method of claim 1, wherein the weather parameter values includes a group comprising one or more of: past outdoor temperatures, past wind chill factors, past heat indices, and past precipitation measurements.

5. The method of claim 1, wherein the utility parameter values includes a group comprising one or more of: past natural gas consumption, past electrical consumption, water consumption, and past heating oil consumption.

6. The method of claim 1, wherein the step of, creating a model which correlates the plurality of utility parameter values and the the set of utility parameter values with corresponding weather parameters values, comprises:
   determining, by one or more processors, a single utility parameter value that corresponds to each weather parameter value.

7. The method of claim 1, wherein the step of, creating a model which correlates the plurality of utility parameter values and the the set of utility parameter values with corresponding weather parameters values, comprises:
   determining, by one or more processors, a first slope for a first portion of determined utility parameter values;
   determining, by one or more processors, a second slope for a second portion of determined utility parameter values; and
   generating, by one or more processors, a model, utilizing a cubic spline approximation, based on the determined first and second slopes.

8. A computer program product for creating a utility demand forecast model for weather parameters, the computer program product comprising:
   one or more computer readable storage media;
   program instructions stored on the one or more computer readable storage media, wherein the one or more computer readable storage media is not a signal per se, which when executed by one or more processors, cause the processor to:
   receive, by one or more processors, a plurality of utility parameter values, wherein each utility parameter value out of the plurality of utility parameter values corresponds to a weather parameter value;
   determine, by one or more processors, that a range of weather parameter values lacks a sufficient amount of corresponding utility parameter values out of the plurality of utility parameters;
   determine, by one or more processors, a set of utility parameter values that corresponds to the range of weather parameter values based on a portion of the plurality of utility parameter values corresponding to the range of weather parameter values lacking a sufficient amount of corresponding utility parameter values;
   create, by one or more processors, a model which correlates the plurality of utility parameter values and the set of utility parameter values with corresponding weather parameters values; and
   provide, by one or more processors, an amount of a utility to one or more structures based on the model.

9. The computer program product of claim 8, wherein the step of, determining that a range of weather parameter values lacks a sufficient amount of corresponding utility parameter values, comprises program instructions, stored on the one or more computer readable storage media, which when executed by a processor, cause the processor to:
   determine, by one or more processors, that an amount of received utility parameter values that correspond to the range of the weather parameter values neither meet nor exceed a threshold.

10. The computer program product of claim 9, wherein the step of, determining a set of utility parameter values that corresponds to the range of weather parameter values, comprises program instructions, stored on the one or more computer readable storage media, which when executed by a processor, cause the processor to:
   determine, by one or more processors, a plurality of utility parameter values that may correspond to a first weather parameter value of the range of weather parameter values, wherein each of the plurality of utility parameter values has an associated probability of occurrence; and
   determine, by one or more processors, one or more utility parameter values from the plurality of utility parameter values, wherein the determined one or more utility parameter values has the highest associated probability of occurrence.

11. The computer program product of claim 8, wherein the weather parameter values includes a group comprising one or more of: past outdoor temperatures, past wind chill factors, past heat indices, and past precipitation measurements.

12. The computer program product of claim 8, wherein the utility parameter values includes a group comprising one or more of: past natural gas consumption, past electrical consumption, water consumption, and past heating oil consumption.

13. The computer program product of claim 8, wherein the step of, creating a model which correlates the plurality of utility parameter values and the the set of utility parameter values with corresponding weather parameters values, stored on the one or more computer readable storage media, which when executed by a processor, cause the processor to:
   determine, by one or more processors, a single utility parameter value that corresponds to each weather parameter value.

14. The computer program product of claim 8, wherein the step of, creating a model which correlates the plurality of utility parameter values and the the set of utility parameter values with corresponding weather parameters values, stored on the one or more computer readable storage media, which when executed by a processor, cause the processor to:
   determine, by one or more processors, a first slope for a first portion of determined utility parameter values;
   determine, by one or more processors, a second slope for a second portion of determined utility parameter values; and
   generate, by one or more processors, a model, utilizing a cubic spline approximation, based on the determined first and second slopes.

15. A computer system for creating a utility demand forecast model for weather parameters, the computer system comprising:
   one or more computer processors;
   one or more computer readable storage media;
   program instructions stored on the one or more computer readable storage media, for execution by at least one of the one or more computer processors, which when executed, cause the computer processor to:
   receive, by one or more processors, a plurality of utility parameter values, wherein each utility parameter value out of the plurality of utility parameter values corresponds to a weather parameter value;

determine, by one or more processors, that a range of weather parameter values lacks a sufficient amount of corresponding utility parameter values out of the plurality of utility parameters;

determine, by one or more processors, a set of utility parameter values that corresponds to the range of weather parameter values based on a portion of the plurality of utility parameter values corresponding to the range of weather parameter values lacking a sufficient amount of corresponding utility parameter values;

create, by one or more processors, a model which correlates the plurality of utility parameter values and the set of utility parameter values with corresponding weather parameters values; and provide, by one or more processors, an amount of a utility to one or more structures based on the model.

16. The computer system of claim 15, wherein the step of, determining that a range of weather parameter values lacks a sufficient amount of corresponding utility parameter values, comprises program instructions, stored on the one or more computer readable storage media, which when executed by a processor, cause the processor to:

determine, by one or more processors, that an amount of received utility parameter values that correspond to the range of the weather parameter values neither meet nor exceed a threshold.

17. The computer system of claim 16, wherein the step of, determining a set of utility parameter values that corresponds to the range of weather parameter values, comprises program instructions, stored on the one or more computer readable storage media, which when executed by a processor, cause the processor to:

determine, by one or more processors, a plurality of utility parameter values that may correspond to a first weather parameter value of the range of weather parameter values, wherein each of the plurality of utility parameter values has an associated probability of occurrence; and determine, by one or more processors, one or more utility parameter values from the plurality of utility parameter values, wherein the determined one or more utility parameter values has the highest associated probability of occurrence.

18. The computer system of claim 15, wherein the utility parameter values includes a group comprising one or more of: past natural gas consumption, past electrical consumption, water consumption, and past heating oil consumption.

19. The computer system of claim 15, wherein the step of, creating a model which correlates the plurality of utility parameter values and the the set of utility parameter values with corresponding weather parameters values, stored on the one or more computer readable storage media, which when executed by a processor, cause the processor to:

determine, by one or more processors, a single utility parameter value that corresponds to each weather parameter value.

20. The computer system product of claim 15, wherein the step of, creating a model which correlates the plurality of utility parameter values and the the set of utility parameter values with corresponding weather parameters values, stored on the one or more computer readable storage media, which when executed by a processor, cause the processor to:

determine, by one or more processors, a first slope for a first portion of determined utility parameter values;

determine, by one or more processors, a second slope for a second portion of determined utility parameter values; and generate, by one or more processors, a model, utilizing a cubic spline approximation, based on the determined first and second slopes.

* * * * *